Nov. 20, 1956     S. W. CROSS     2,771,277
FIN DAMPER INSERT
Filed April 6, 1955

INVENTOR
STANLEY W. CROSS
BY *Charles A. Warren*
ATTORNEY

United States Patent Office 2,771,277
Patented Nov. 20, 1956

2,771,277
FIN DAMPER INSERT

Stanley W. Cross, South Coventry, Conn., assignor to United Aircraft Corporation, East Hartford, Conn., a corporation of Delaware Application April 6, 1955, Serial No. 499,558

6 Claims. (Cl. 257—261)

This invention relates to fin dampers for the cooling fins on engine cylinders of air-cooled internal combustion engines.

In air cooled engines especially in aircraft, one major problem is to pass enough cooling air over the fins to assure adequate cooling. This problem has been solved to some extent by increasing the depth of the fins to provide a larger cooling area. With the deeper fins the vibration of the fins has increased and dampers have been applied to the fins to minimize vibrations.

One example of such dampers is shown in the Elliott Patent 2,581,845, in which the outer edges of the several fins are held by the damping strip which extends substantially at right angles to the fins. Each damping strip functions to minimize vibration at the outer edge of the fins but does not stop vibrations of the fins between the cylinder wall from which the fins project and the outer edges of the fins. One feature of the invention is a damper by which to damp vibrations across the entire width or depth of the fin. Another feature is a fin damper that is readily adapted to different widths of fins. One feature is a damper which is readily installed and which once installed will remain in position without additional attachment means.

Other objects and advantages will be apparent from the specification and claims, and from the accompanying drawings which illustrate an embodiment of the invention.

The invention is shown as applied to a portion of a cylinder 2 for an air-cooled piston engine. The cylinder has a plurality of outwardly projecting parallel fins 4 preferably uniformly spaced apart. As shown, the fins extend circumferentially around the cylinder although they may be arranged at different angles thereto. One example of an engine utilizing finned cylinders of this character for which the vibration damper is particularly applicable, is described in the Hobbs Patent 2,426,871. This patent discloses a radial engine having banks of cylinders extending in a fore and aft direction with respect to the flow of cooling air with baffles for directing the flow of air around the cylinders. It will be understood that the fin dampers hereinafter described are so positioned as not to interfere with the flow of air around and between the fins and accordingly would be generally located in a direction parallel to the flow of cooling air approaching the cylinder.

Figure 1:
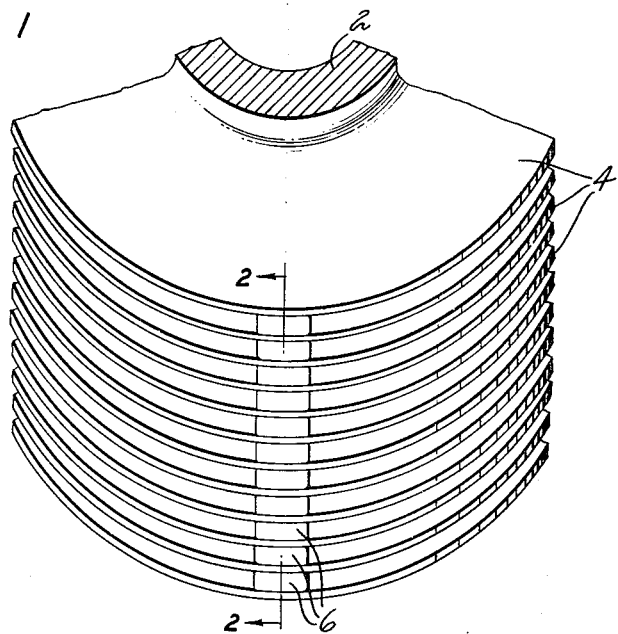
Fig. 1 is a perspective view of a portion of a finned cylinder with the dampers inserted therein.
Figure 2:
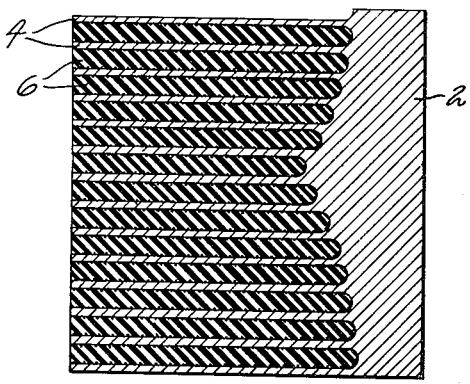
Fig. 2 is a sectional view along the line 2—2 of Fig. 1.

Each damper 6 is in the form of a slug of material which is substantially equal in thickness to the spacing between the fins so that each slug may be radially inserted between adjacent fins, as best shown in Figs. 1 and 2. The width of the slug is several times the thickness being preferably two to four times as wide as the slug is thick.

The slugs are formed of a heat-curable compound such as a silicone rubber compound which may have asbestos fibers added thereto. In forming the slug, a chunk of this material which is somewhat thinner and narrower than the completed slug is wrapped in an aluminum wire mesh 8, preferably of about 16 or 18 mesh, which forms an enclosure for the slug thereby tending to make the slug more shape retaining and to assure that the slug remains in a unitary piece after curing. In certain instances, the slug may consist only of the inner chunk and the surrounding aluminum wire mesh.

Figure 3:
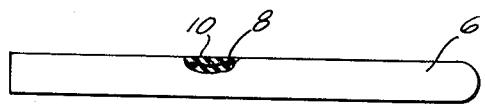
Fig. 3 is a side elevation of one of the dampers with a portion broken away.
Figure 4:
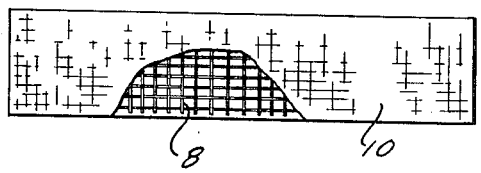
Fig. 4 is a plan view of one of the dampers with a portion broken away.

It is generally preferable, however, as shown in Figs. 3 and 4, to wrap the chunk and enclosing wire in a thin sheet 10 also of a heat-curable material and preferably of the same material as the inner chunks. The outer covering 10 is preferably from one to two hundredths of an inch thick.

The completely formed slugs are inserted in a radial position between adjacent fins 4, as best shown in Figs. 1 and 2 and are also preferably extended far enough in to engage with the cylinder wall from which the fins project. When inserted, the material forming the slug is uncured. After the slugs are in place they are cured by the heat of the engine cylinder during the operation of the engine after the slugs have been inserted. Alternatively, they may be cured by heating the cylinder with the slugs therein in a suitable furnace before assembly in an engine. The curing process hardens the slug and also causes a bond between the fins and the material of the slug which retains the slug in position between the fins. Each slug preferably terminates at the outer periphery of the fins. It will be apparent that the slugs may easily be cut to a suitable length to accommodate the varying depths of the fins, as shown in Fig. 2. The series of slugs for damping the several fins on the cylinder are preferably arranged in an axial row parallel to the cylinder and, as above stated, are preferably located so that each slug extends substantially parallel to the direction of the flow of air approaching the cylinder.

It is to be understood that the invention is not limited to the specific embodiment herein illustrated and described, but may be used in other ways without departure from its spirit as defined by the following claims.

I claim:

1. The combination with an engine cylinder having a plurality of cooling fins on the outer surface, of a vibration damper for two adjacent fins consisting of a slug of vibration damping material positioned substantially radially of the cylinder between adjacent fins, said slug having a wire mesh around it.

2. The combination with an engine cylinder having a plurality of cooling fins on the outer surface, of a vibration damper for several adjacent fins consisting solely of a series of separate unconnected slugs of vibration damping material positioned substantially radially of the cylinder between adjacent fins, each slug being substantially as thick as the space between the fins and substantially as long as the radial depth of the fins between which the slug is located, said slugs, when in position, terminating substantially at the periphery of the fins.

3. The combination with an engine cylinder having a plurality of cooling fins on the outer surface, of a vibration damper for two adjacent fins consisting of a slug of vibration damping material positioned substantially radially of the cylinder between adjacent fins, said slug having a wire mesh around it, and a thin layer of vibration damping material over the wire mesh.

4. The combination with an engine cylinder having a plurality of cooling fins on the outer surface, of a vibration damper for several adjacent fins consisting solely of a series of separate unconnected slugs of vibration damping material positioned substantially radially of the cylinder between adjacent fins, each of said slugs being substantially equal in length to the radial depth of the fins, each slug being substantially as thick as the space between the fins and being on the order of two to four times as wide as the thickness, said slugs, when in position, terminating substantially at the periphery of the fins.

5. The combination with an engine cylinder having a plurality of cooling fins on the outer surface, of a vibration damper for several adjacent fins consisting of a plurality of unconnected slugs of vibration damping material each of which is substantially as thick as the spacing between adjacent fins, said slugs being positioned between the fins and substantially radially of the cylinder, the plurality of slugs being arranged in a row substantially at right angles to the fins, each of said slugs having a wire mesh around it.

6. The combination with an engine cylinder having a plurality of cooling fins on the outer surface, of a vibration damper for several adjacent fins consisting of a plurality of separate unconnected slugs of vibration damping material each of which is substantially as thick as the spacing between adjacent fins, said slugs being positioned between the fins and substantially radially of the cylinder, the plurality of slugs being arranged in a row substantially at right angles to the fins, each of said slugs having a wire mesh around it and a thin layer of additional vibration damping material covering the wire mesh.

References Cited in the file of this patent
UNITED STATES PATENTS

| | | |
|---|---|---|
| 2,253,025 | Fedden et al. | Aug. 19, 1941 |
| 2,455,708 | Sherwin | Dec. 7, 1948 |
| 2,563,415 | Pennington | Aug. 7, 1951 |
| 2,581,845 | Elliott | Jan. 8, 1952 |
| 2,635,858 | Keller | Apr. 21, 1953 |
| 2,641,024 | Panagrossi | June 9, 1953 |